Feb. 23, 1965  G. M. EGGERS  3,170,682
VARIABLE RATE LEAF SPRING SUSPENSION
Filed Aug. 9, 1963
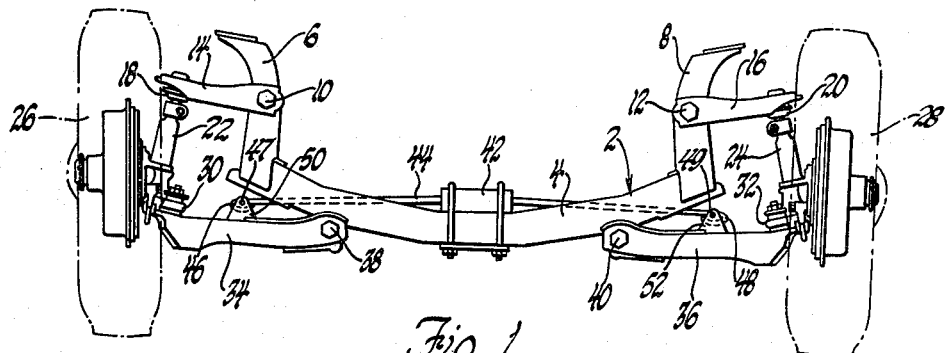
INVENTOR.
George M. Eggers
BY
W. F. Wagner
ATTORNEY

United States Patent Office 3,170,682
Patented Feb. 23, 1965

3,170,682
VARIABLE RATE LEAF SPRING SUSPENSION
George M. Eggers, Detroit, Mich., assignor to General Motors Corporation, Detroit, Mich., a corporation of Delaware
Filed Aug. 9, 1963, Ser. No. 301,138
13 Claims. (Cl. 267—52)

This invention relates to leaf spring suspension and more particularly to leaf spring suspension of the type exhibiting differing rate characteristics under conditions of roll deflection and parallel ride deflection, respectively.

Utilization of leaf springs as the elastic medium in both front and rear suspension is a well known expedient in the prior art. The present invention is concerned primarily with the type of suspension in which the leaf spring is mounted with reference to the sprung mass and suspension linkage components in such a way that one end of the spring functions as the elastic medium for one wheel suspension linkage, while the other end functions as the elastic medium for the opposite wheel suspension linkage. In a typical case in the prior art, the center of a transversely disposed leaf spring is fixedly secured to the vehicle chassis and the opposite ends thereof are pivotally connected to, or otherwise engage transversely oppositely extending vertically swingable wheel control arms so that upon upward deflection of the wheels, each of the oppositely extending portions of the spring function independently as the elastic medium with respect to the associated control arms. In other cases, the opposite or cantilever portions of the spring may function as one of a pair of vertically spaced transversely extending wheel control arms, in which case the spring performs a dual function. However, in all cases, constructions utilizing transverse leaf springs normally exhibit a constant rate characteristic which requires the provision of additional elastic members to produce a different rate characteristic during roll deflection than is exhibited under parallel ride deflection. In connection with the so-called independent front wheel suspension, these additional elastic members are commonly referred to as roll stabilizers and usually take the form of a transverse torsion bar having bent end portions arranged with reference to the linkage so that the bar is torsionally inactive under conditions of parallel ride deflection, but becomes torsionally active under conditions of roll deflection. Consequently, the effective rate of the transverse leaf spring is augmented under conditions of roll but not under conditions of parallel ride deflection.

According to the present invention, suspension linkage utilizing a transverse leaf spring is constructed and arranged in such a manner as to accomplish modification of the effective rate of the leaf spring during vehicle roll deflection without the addition of any auxiliary elastic medium, but solely as a function of suspension geometry incident to parallel ride and roll deflection, respectively.

An object of the present invention is to provide an improved vehicle suspension.

Another object of the present invention is to provide an improved suspension construction utilizing a leaf spring arranged so that each of the opposite ends thereof serves as the elastic medium for one of a pair of spaced apart wheel suspension linkages.

A further object is to provide a suspension construction of the stated character which is mounted on the vehicle chassis and geometrically oriented with respect to the suspension linkage in such a way as to accomplish differential rate characteristics as a function of contrasting deflection behavior of the vehicle.

A still further object is to provide a construction of the type described which may be arranged either to induce a higher spring rate under conditions of roll deflection than occur during parallel ride deflection, or vice versa.

Still another object is to provide a leaf spring arrangement of the stated character which is applicable to either single or double swing arm suspension linkages.

These and other objects, advantages and features of the invention will become more fully apparent as reference is had to the accompanying specification and drawing wherein:

FIGURE 1 is a fragmentary front elevational view of a portion of a vehicle chassis and associated independent front wheel suspension linkage embodying the present invention;

FIGURE 2 is an enlarged front elevational view in section illustrating the mode of attachment of the leaf spring to the vehicle chassis;

FIGURE 3 is an enlarged front elevational view in section illustrating the mode of attachment of the free ends of the spring to the wheel suspension linkage;

FIGURE 4 is an enlarged front elevational view in section illustrating a modification in the form of attachment shown in FIGURE 2; and FIGURE 5 is a diagrammatic view of a swing axle independent rear suspension incorporating the invention.

Referring now to the drawings and particularly FIGURE 1, there is illustrated in independent front wheel suspension arrangement wherein the reference numeral 2 generally designates the vehicle frame or superstructure. Frame 2 includes a transversely extending cross member 4 having upstanding pillar portions 6 and 8 attached at the opposite sides thereof. Pivotally attached to pillars 6 and 8 by generally longitudinally extending pivot members 10 and 12, respectively, are a pair of transversely oppositely extending upper control arms 14 and 16, the outer ends of which are pivotally connected by ball joint assemblies 18 and 20 to generally vertically extending wheel knuckle elements 22 and 24. Knuckle elements 22 and 24 dirigibly and rotatably support road wheels 26 and 28, respectively. At their lower ends, knuckles 22 and 24 are pivotally connected by ball joint assemblies 30 and 32 to the outer ends of a pair of transversely oppositely extending lower control arms 34 and 36. The inboard ends of arms 34 and 36 in turn are pivotally connected to cross member 4 by generally longitudinally extending pivot shafts 38 and 40 located somewhat inboard of pivot shafts 10 and 12.

Secured centrally on the upper surface of cross member 4 is a box-like support member 42 in which is received the central portion of a transversely extending leaf spring 44. The opposite extremities of spring 44 are formed with eyes 46 and 48 which are pivotally secured by pins 47 and 49 to upstanding brackets 50 and 52 formed on control arms 34 and 36 generally midway of the length thereof.

As seen best in FIGURE 2, the laterally opposite side walls 54 and 56 of support 42 are formed with rectangular slots 58 and 60 of somewhat larger dimension than the cross-sectional area of spring 44, while the interior of support 42 forms a generally rectangular cage 62 in which are arranged a series of anti-friction roller bearings 64 and 66. Thus, when support 42 is clamped in the position shown in FIGURE 1, the center of spring 44 is retained against vertical displacement relative to cross member 4 while roller bearings 64 and 66 allow free rectilinear movement therein.

As seen best in FIGURE 3, the eye 48 at the outer extremity of the right hand portion of spring 44 is rolled in a generally elliptic form and has disposed therein an elliptical elastic bushing element 68 having a cylindrical bore. Element 68 surrounds a cylindrical pin 49 which is in turn supported on control arm 36 by bracket 52. It will be understood that identical construction is employed relative to spring eye 46.

Returning now to FIGURE 1, it will be seen that under conditions of parallel ride deflection, that is, deflection of the superstructure 2 parallel to the road surface, the wheel suspension linkage at each side of the vehicle will function in geometric symmetry. Hence, as the superstructure descends, the lower control arms 34 and 36 will swing upwardly the same amount about their pivotal connections 38 and 40 and thus elastically deflect the right and left hand portions of the leaf spring 44 in equal amounts. Naturally, during this mode of operation, the pins 47 and 49 within spring eyes 46 and 48 are caused to swing inwardly and upwardly due to convergent angular movement of control arms 34 and 36. However, the necessary foreshortening of distance between pins 47 and 49 is accommodated by elastic deflection of the elliptical mass of rubber 68 and therefore relieves undesirable compressive stresses along the major axis of the spring. With respect to parallel ride deflection, it will be seen that support 42 functions only to establish a fixed vertical level for the center of the spring comparable to the conventional sandwich clamp utilized in the prior art.

According to the principal features of the invention, when the vehicle is subjected to roll deflection, that is, angular displacement of the sprung mass 2 about its longitudinal or roll axis, the freedom of rectilinear movement of spring 44 in support 42 coupled with the geometric orientation of the spring eyes relative to the linkage induces a predetermined lateral translation of the spring within support 42 so that the portion of the spring at one side of the clamp is progressively reduced in length, while the portion at the other side of the clamp is progressively increased in length a corresponding amount, with the result that the effective rate of the portion of the leaf spring on the loaded side of the vehicle is increased and consequently offers greater resistance to the roll deflection. By way of example, if control arm 34 rises about pivot 38 while control arm 36 descends about pivot 40, the spring eye 46 is caused to move in an upward and inward arc about pivot 38, while spring eye 48 is caused to move in a downward and outward arc about pivot 40. Under such conditions, the distance between the spring eye 46 and support 42 is obviusly reduced, while the distance between spring eye 48 and support 42 increases in length correspondingly. As a result, the left hand portion of the spring offers greater resistance to upward deflection of control arm 34, while the right hand portion of the spring offers reduced resistance to downward deflection of control arm 36. Naturally, roll deflection in the opposite direction produces identical results but in a reverse sense. It is to be noted particularly that the disclosed arrangement depends for operability upon locating the pivotal connection of spring eyes 46 and 48 at a vertical level above the horizontal plane containing the pivot shafts 38 and 40 so that each eye is given an inward component of movement upon upward movement of the associated arm and an outward component of movement upon downward movement of the arm. Naturally, the exact distance of such pivots are located above the indicated plane and the distance such pivots are located outwardly from pivots 38 and 40 will determine the extent of increase in roll stiffness obtained, and these distances will vary according to vehicle design factors such as weight, size, center of gravity, etc.

As thus far described, the invention has been related exclusively to a suspension linkage of the type which inherently requires additional roll stiffness, of which the so-called parallel wishbone type independent front suspension is typical. However, as is well known to those skilled in the art, certain types of independent rear suspension structures exhibit operating characteristics in which the reverse is true, that is, with conventional springing the roll stiffness exceeds the parallel ride stiffness. The so-called single arm swing axle independent rear suspension shown in FIGURE 5 is the classic example of the latter. This type of suspension has been found to possess undesirably high roll stiffness and a variety of expedients have been proposed in the prior art to produce suspension characteristics wherein parallel ride stiffness or rate is significantly higher than the roll stiffness or rate. The present invention, however, possesses the added advantage of being simply and easily applicable to either increase or decrease in roll rate, as may be desired.

In FIGURE 5, there is shown a modification of the invention as applied to a swing axle suspension of the type wherein the vehicle superstructure 72 has suspended therefrom a differential drive assembly 74. Assembly 74 has operatively connected thereto transversely oppositely extending live axles, not shown, surrounded by axle housings 76 and 78 having driven road wheels 80 and 82 mounted at the outer ends thereof. In the embodiment shown in FIGURE 5, a support 84 identical in form to support 42 is clamped beneath drive assembly 74 so that the spring 86 extends transversely therethrough below the longitudinal axes 88 and 90 (colinear with the geometric centers of universal joints, not shown) about which live axles 76 and 78 swing. The elliptical eyes 92 and 94 of spring 86 engage downwardly extending brackets 96 and 98 formed on live axles 76 and 78 so that the pivotal connections 100 and 102 are located equidistant vertically below the horizontal plane containing axes 88 and 90. Inasmuch as the arrangement disclosed constitutes a geometric reversal of the structure shown in FIGURE 1, it will be evident that the direction of foreshortening of spring 86 under conditions of roll deflection will be reversed; that is, the portion of the spring 86 on the heavily loaded side of the vehicle will become longer, while the portion on the lightly loaded side will become shorter and naturally produce less roll resistance than would be the case if the length of the spring at each side of support 84 remained uniform.

In FIGURE 4, there is shown a modified form of the support 42 together with a slightly modified spring construction. In the embodiment shown, the support 104 is increased in depth to provide for a rectangular metal casing 106 which surrounds an elastic sleeve 108 enveloping the central portion of spring 110 throughout a length at least as great as the normal linear translation to be encountered in vehicle operation. In the modified construction, the casing 106 serves to provide smooth bearing engagement with roller bearings 112 and 114, while allowing sufficient flexibility in the contained portion of spring 110 to offset any undesirably high load concentrations.

While several embodiments of the invention have been shown and described, it will be apparent that other changes and modifications may be made therein. It is, therefore, to be understood that it is not intended to limit the invention to the embodiment shown, but only by the scope of the claims which follow.

I claim:

1. A variable rate leaf spring suspension comprising, a sprung mass, a leaf spring rectilinearly movable in a bearing member supported in a fixed vertical position on the sprung mass, a pair of road wheels mounted on lever arms pivotally connected to the sprung mass for movement in a path coplanar with the rectilinear path of movement of said spring, and means pivotally connecting the opposite ends of said spring to the respective lever arms in vertically spaced relation to the horizontal plane of the pivotal connection of said lever arms.

2. A variable rate leaf spring suspension comprising, a sprung mass, a leaf spring rectilinearly movable in a bearing member supported in a fixed vertical position on the sprung mass, a pair of road wheels mounted on oppositely extending lever arms pivotally connected to the sprung mass for movement in a path coplanar with the rectilinear path of movement of said spring, and means pivotally connecting the opposite ends of said spring to the respective lever arms in vertically spaced relation to the horizontal plane of the pivotal connection of said lever arms.

3. A variable rate leaf spring suspension comprising, a sprung mass, a support mounted in a fixed position on said sprung mass, rectilinear bearing means formed in said support, a leaf spring extending through said support in rectilinearly movable bearing engagement with said bearing means, a pair of road wheels mounted on the free ends of a pair of lever arms, means pivotally connecting the other ends of said arms to the sprung mass on axes transverse to the major axis of said spring, and means pivotally connecting the opposite ends of said spring to intermediate portions of the respective lever arms located in vertically spaced relation to the horizontal plane of the pivotal connections of said lever arms to said sprung mass.

4. A variable rate leaf spring suspension comprising, a sprung mass, a support mounted in a fixed position on said sprung mass, horizontal rectilinear bearing means formed in said support, a leaf spring extending through said support in rectilinearly movable bearing engagement with said bearing means, a pair of road wheels mounted on the free ends of a pair of lever arms, means pivotally connecting the other ends of said arms to the sprung mass on axes transverse to the major axis of said spring, and means pivotally connecting the opposite ends of said spring to intermediate portions of the respective lever arms located in vertically spaced relation to the horizontal plane of the pivotal connections of said lever arms to said sprung mass.

5. A variable rate leaf spring suspension comprising, a sprung mass, a leaf spring rectilinearly movable transversely of the vehicle in a bearing member supported on the sprung mass at a fixed vertical level, a pair of road wheels mounted on transversely extending lever arms pivotally connected to the sprung mass for swinging movement in planes generally parallel with the vertical plane of rectilinear movement of said spring, and means pivotally connecting the opposite ends of said spring to the respective lever arms in vertically spaced relation to the horizontal plane of the pivotal connections of said lever arms to said sprung mass.

6. A variable rate leaf spring suspension comprising, a sprung mass, a leaf spring rectilinearly movable longitudinally transversely of the vehicle in a bearing member supported on the sprung mass at a fixed vertical level, a pair of road wheels mounted on horizontally transversely extending lever arms pivotally connected to the sprung mass for swinging movement in planes generally parallel with the vertical plane of rectilinear movement of said spring, and means pivotally connecting the opposite ends of said spring to the respective lever arms in vertically spaced relation to the horizontal plane of the pivotal connections of said lever arms to said sprung mass.

7. A variable rate leaf spring suspension comprising, a sprung mass, a leaf spring rectilinearly movable longitudinally transversely of the vehicle in a bearing member supported on the sprung mass at a fixed vertical level, a pair of road wheels mounted on horizontally transversely extending lever arms pivotally connected at horizontally spaced points to the sprung mass for swinging movement in planes generally parallel with the vertical plane of rectilinear movement of said spring, and means pivotally connecting the opposite ends of said spring to the respective lever arms in vertically spaced relation to the horizontal plane of the pivotal connections of said lever arms to said sprung mass.

8. A variable rate leaf spring suspension comprising, a sprung mass, a leaf spring rectilinearly movable longitudinally transversely of the vehicle in a bearing member supported on the sprung mass at a fixed vertical level, a pair of road wheels mounted on horizontally transversely extending lever arms pivotally connected at horizontally spaced points to the sprung mass for swinging movement in planes generally parallel with the vertical plane of rectilinear movement of said spring, and means pivotally connecting the opposite ends of said spring to the respective lever arms in vertically upwardly spaced relation to the horizontal plane of the pivotal connections of said lever arms to said sprung mass.

9. A variable rate leaf spring suspension comprising, a sprung mass, a leaf spring rectilinearly movable longitudinally transversely of the vehicle in a bearing member supported on the sprung mass at a fixed vertical level, a pair of road wheels mounted on horizontally transversely extending lever arms pivotally connected at horizontally spaced points to the sprung mass for swinging movement in planes generally parallel with the vertical plane of rectilinear movement of said spring, and means pivotally connecting the opposite ends of said spring to the respective lever arms in vertically downwardly spaced relation to the horizontal plane of the pivotal connections of said lever arms to said sprung mass.

10. In a vehicle, the combination comprising a sprung mass, a pair of wheel control arms pivotally connected at their inner ends to said sprung mass, a pair of road wheels rotatably supported on the outer ends of said control arms, a leaf spring extending between said wheels and pivotally connected at its opposite ends to said control arms in vertically spaced relation to the horizontal plane containing the pivotal connections of said control arms, and means supporting the center of said spring on said sprung mass in a manner resisting vertical movement of the former, said means including anti-friction bearing means permitting rectilinear movement of said spring upon opposite deflection of said wheels.

11. In a vehicle, the combination comprising a sprung mass, a pair of oppositely extending wheel control arms pivotally connected at their inner ends to said sprung mass, a pair of road wheels rotatably supported on the outer ends of said control arms, a leaf spring extending between said wheels and pivotally connected at its opposite ends to said control arms in vertically spaced relation to the horizontal plane containing the pivotal connections of said control arms, and means supporting the center of said spring on said sprung mass in a manner resisting vertical movement of the former, said means including anti-friction bearing means permitting rectilinear movement of said spring upon opposite deflection of said wheels.

12. The structure set forth in claim 11 wherein the center of said spring is surrounded by an elastic sleeve encased by a rigid member in bearing engagement with said anti-friction bearing means.

13. In a motor vehicle having a pair of spaced apart road wheels mounted respectively on the outer ends of a pair of wheel control arms, coplanar pivot means connecting the inner ends of said control arms to said vehicle, a leaf spring extending between said wheels, means slidably connecting said spring to said vehicle for rectilinear movement in a plane parallel to the major axis of said spring, said means being secured in a fixed vertical position on said vehicle, and means pivotally connecting the opposite outer ends of said spring to the respective wheel control arms at corresponding vertical levels spaced from the plane of said coplanar pivots.

References Cited in the file of this patent

UNITED STATES PATENTS 2,202,918    Peo _____ June 4, 1940

FOREIGN PATENTS 1,161,498    France _____ Mar. 24, 1958